United States Patent [19]
Silverbrook et al.

[11] Patent Number: 5,444,839
[45] Date of Patent: Aug. 22, 1995

[54] OBJECT BASED GRAPHICS SYSTEM FOR RASTERIZING IMAGES IN REAL-TIME

[75] Inventors: Kia Silverbrook, Wollahra; Michael J. Webb, Lane Cove; David W. Funk, Meadowbank; Simon R. Walmsley, Epping, all of Australia

[73] Assignees: Canon Kabushiki Kaisha, Tokyo, Japan; Canon Information Systems & Research Australia Pty Limited, NSW, Australia

[21] Appl. No.: 53,373

[22] Filed: Apr. 28, 1993

[30] Foreign Application Priority Data

Apr. 29, 1992 [AU] Australia ............................. PL 2147

[51] Int. Cl.⁶ .............................................. G06F 15/72
[52] U.S. Cl. ..................................................... 395/141
[58] Field of Search ............... 395/141, 142, 143, 140, 395/133; 345/135, 133, 136

[56] References Cited

U.S. PATENT DOCUMENTS

| | | | |
|---|---|---|---|
| 4,837,447 | 6/1989 | Pierce et al. ...................... | 250/492.2 |
| 5,305,432 | 4/1994 | Kubota ................................. | 395/143 |
| 5,313,573 | 5/1994 | Takahama ........................... | 395/150 |

FOREIGN PATENT DOCUMENTS 4000021 7/1991 Germany .

OTHER PUBLICATIONS

"A Monolithic Scan-Line Bit Producer For Real-Time Image Rasterization", Kanopoulos, et al., Microprocessing And Microprogramming, vol. 21, No. 1-5, Aug. 1987, pp. 57-64.

"Computer Graphics: Principles 1-23 And Practice (Second Edition)", Foley, et al., 1990, (Chapter 15, Section 15.6), pp. 680-686.

"Automatic Curve Fitting with Quadratic B-Spline Functions And Its Applications to Computer-Assisted Animation", Yang, et al., Computer Vision, Graphics And Image Processing, vol. 33, 1986, pp. 346-363.

Primary Examiner—Phu K. Nguyen
Attorney, Agent, or Firm—Fitzpatrick, Cella, Harper & Scinto

[57] ABSTRACT

An object based graphics processor includes an input device for receiving object outlines of an image intended for rasterized display, each of the outline comprising at least one object fragment, a sorter for sorting the object fragments into a rasterization sequence corresponding to a scan line in a raster format for rasterized display, and a storage having a first storage area and a second storage area connected to the sorter for storing the rasterization sequence in one of the storage areas. A reading device connected to the storage reads a previously stored rasterization sequence in real-time and calculates object edges in a respective scan line, and prioritizing device assigns pixel data values within each of the scan lines based upon priority levels assigned to the object edges. The pixel data values are output from the processor for rasterized display.

20 Claims, 7 Drawing Sheets

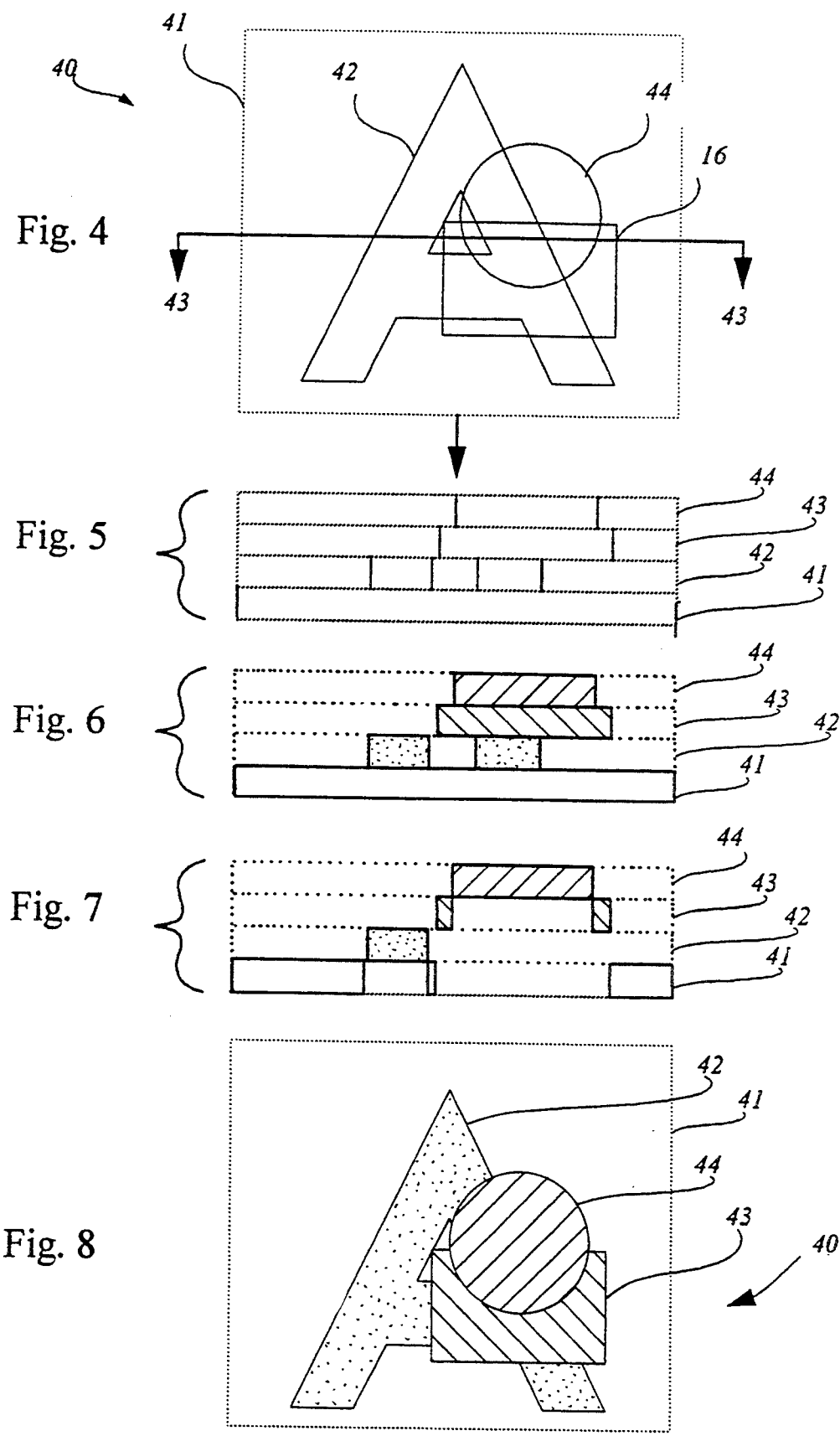

Correct Display

Actual Display

Correct Display

Actual Display

OBJECT BASED GRAPHICS SYSTEM FOR RASTERIZING IMAGES IN REAL-TIME

BACKGROUND

1. Field of the Invention

The present invention relates to a graphics system, and in particular discloses a graphics system capable of producing a rasterized image in real time.

2. Description of the Related Art

Most object based graphics systems utilize a frame store to hold a pixel based image of the page or screen. The outlines of the objects am calculated, filled in and written into the frame store. For two-dimensional graphics, objects which appear in front of other objects are simply written into the frame store after the background object, thereby replacing the background on a pixel-by-pixel basis. This is commonly known in the art as "Painter's algorithm". Images are calculated in object order, from the rearmost object to the foremost object. However, real-time image generation for raster displays requires that the images be calculated in raster order. This means that each scan-line must be calculated as it is reached. This requires that the intersection points of each scan line with each object outline are calculated and subsequently filled.

Although it is possible, with a line buffer rather than a page buffer, to use the Painter's algorithm within a scan-line to fill the objects, such an approach does not achieve image generation in real-time, particularly at video data rates.

SUMMARY OF THE INVENTION

It is an object of the present invention to substantially overcome, or ameliorate, the abovementioned problem through provision of a graphics system which can operate at real-time data rates and which does not include an image frame store.

In accordance with a first aspect of the present invention, them is disclosed an object based graphics system configured for processing outlines of objects defined by a plurality of curves intended for display, characterized in that images produced by the system are formed by the real-time rasterisation of said curves without the use of a frame store.

In accordance with a second aspect of the present invention, there is disclosed an object based graphics processor comprising, and the input means receives object outlines of an image intended for rasterized display, each of the outlines comprise at least one object fragment, Sorting means sorts the object fragments into a rasterization sequence corresponding to each display line of a raster format, and reading means read the sequence in real-time and calculating object edges in each of the display lines, and priority means assigns pixel data values within each of the display lines based upon priority levels assigned to the object edges. The said pixel data values are output from the processor for rasterized display.

In accordance with a third aspect of the present invention there is disclosed an object based graphics system comprising:

a host processor means having an associated memory means for storing outlines of graphic objects. The host processor means said adapted to generate from the outlines lists of the outlines wherein each of the list represents data relating to an image intended for rasterised display, display means displays the image, and colouring means associates colour data with each of the objects, the colour data is output to the display means in a rasterised format.

An object based graphics processor as in the first or second aspect interposed between the host processor and the colouring means receives the lists and outputs pixel data values to the colouring means in real-time to permit real-time display of the image on the display means.

BRIEF DESCRIPTION OF THE DRAWINGS

A preferred embodiment of the present invention will now be described with reference to the drawings in which:

FIGS. 4 to 8 illustrate some of the steps of real-time object image generation;

DETAILED DESCRIPTION OF THE PREFERRED EMBODIMENT

Figure 1:
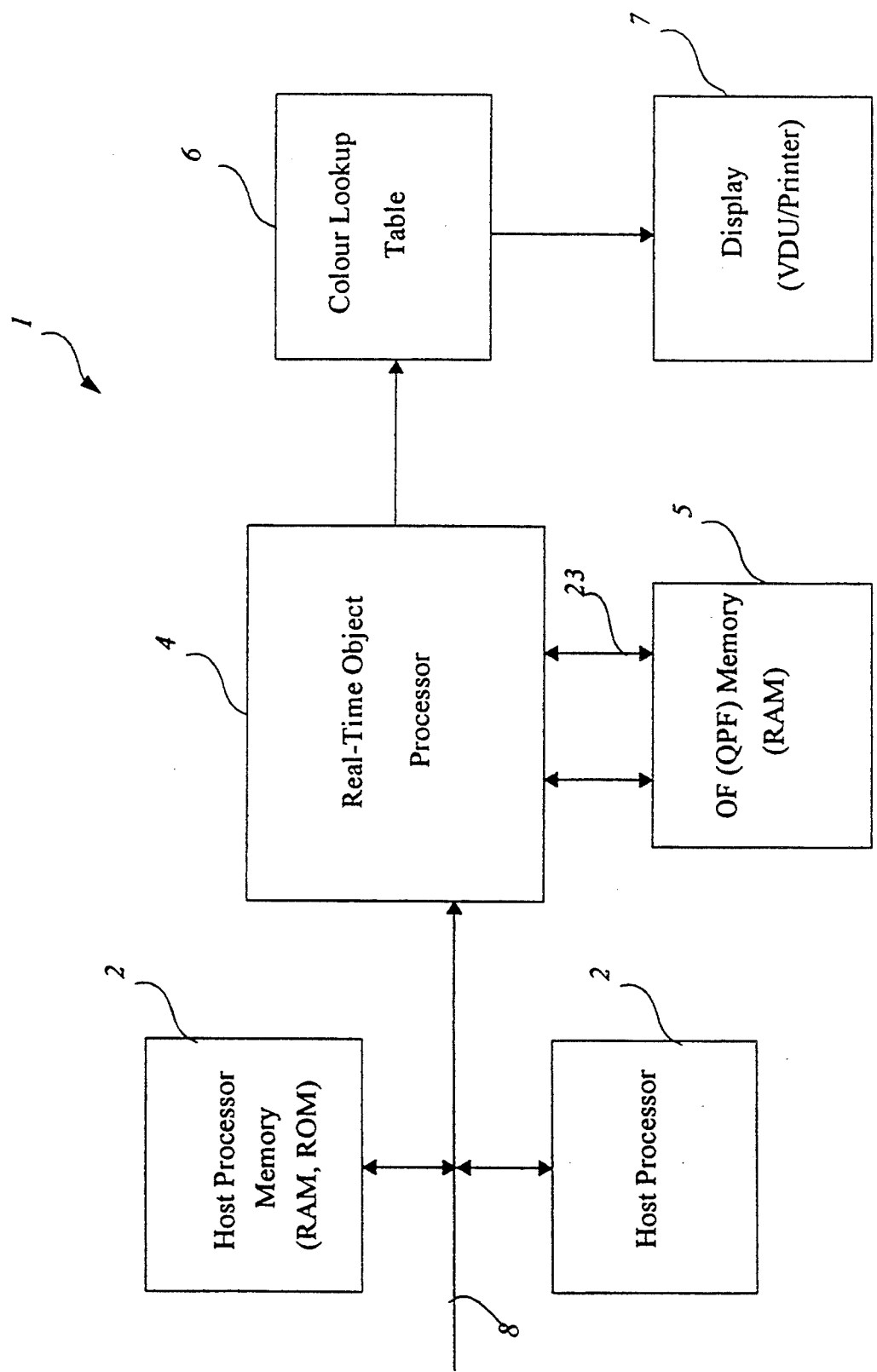
FIG. 1 is a block diagram representation of a graphics system incorporating a real-time object (RTO) processor of the preferred embodiment.

Referring to FIG. 1, a real-time object (RTO) graphics system 1 is shown which includes a controlling host processor 2 connected to a standard processor memory 3 including ROM and RAM, via a processor bus 8. Connected to the processor bus 8 is a RTO processor 4 which interfaces directly with a dedicated object fragment (OF) memory 5 which is formed as RAM. The RTO processor 4 outputs to a colour look-up table 6 which is configured to output colour pixel data directly to a display 7 such as a VDU or a colour printer.

The host processor 2 is configured in a manner corresponding to prior art object based graphics systems to generate image data on the basis of object graphics either input or selected by a user. A object list can be formed comprising a series of objects and stored in the memory 3 prior to image generation and display. The object graphics are formed as a mathematical representation of the outline of geometric objects which comprise the resultant image. Unlike the prior art arrangements, RTO processor 4 operates to convert these mathematical representations into filled images in real-time. The process of conversion of these outlines into an image is called rasterization.

In this specification the term "real-time" refers to the ability of the processor 4 to create pixel image data rate in synchronization with the display 7. If the display 7 is a video display, the data rate is accordingly approximately 25 frames per second. Alternatively, if the display 7 is a colour printer, which is configured for slow printing, the data generation rate of the processor 4 can be significantly reduced. In the preferred embodiment a pixel data rate of 13.5 MBytes per second is used which permits 25 interlaced frames per second to be displayed for video applications, as well as matching the pixel data rate of a Canon Colour Laser Photocopier CLC500 which can thereby print an A3 size full colour 400 dpi image in about 20 seconds.

There are two reasons why real-time rasterization is advantageous. Firstly, the use of real-time rasterization means that an image frame store is no longer required. Whilst this is not particularly significant for video images, where the broadcast frame store requires approximately 1 Mbyte, it is quite significant for higher resolution image printing. A frame store for a colour laser copier requires approximately 100 Mbytes of memory which currently costs about A$5,000.00. This cost is entirely eliminated where real-time rasterization is used.

Real-time animation requires very fast manipulation of image data, such that images are generated at the same rate at which they are displayed. Rasterizating directly from object data, without an intermediate frame store, allows animation to be achieved by applying transformations to object data, which requires far smaller computational effort than performing equivalent manipulation on data in pixel form.

The RTO processor 4 manipulates object fragments (OFs) of the curve outline of an object, rather than entire objects because such fragments are generally represented by much smaller and less complicated mathematical expressions. Accordingly, because of their smaller size and lower level of complexity, each object fragment can be processed more quickly and with greater ease. This assists in providing real-time operation.

The graphic objects can be provided in any known format such as Bezier splines which are generally cubic polynomials, and then divided into smaller object fragments which can be readily processed.

Alternatively, the objects can be expressed as quadratic polynomial fragments (QPFs) which are simpler in structure than fragments formed from Bezier splines and therefore much easier to process. Accordingly, QPFs are easier to integrate using current technology levels where the RTO processor 4 is configured as a single integrated device and QPF's are the format of object fragments used in the preferred embodiment. A detailed description of QPFs can be derived from U.S. patent application Ser. No. 08/053,219, filed Apr. 28, 1993, entitled "Object Based Graphics Using Quadratic Polynomial Fragments" claiming priority from Australian Patent Application No. PL2150 filed Apr. 29, 1992 and the disclosure of which is hereby incorporated by reference.

Furthermore, it is possible to convert Bezier splines into QPF formats and this is disclosed in U.S. patent application Ser. No. 08/053,213, filed Apr. 28, 1993, entitled "Bezier Spline to Quadratic Polynomial Fragment Conversion" claiming priority from Australian Patent Application PL2149 of filed Apr. 29, 1992 and the disclosure of which is hereby incorporated by reference.

Figure 2:
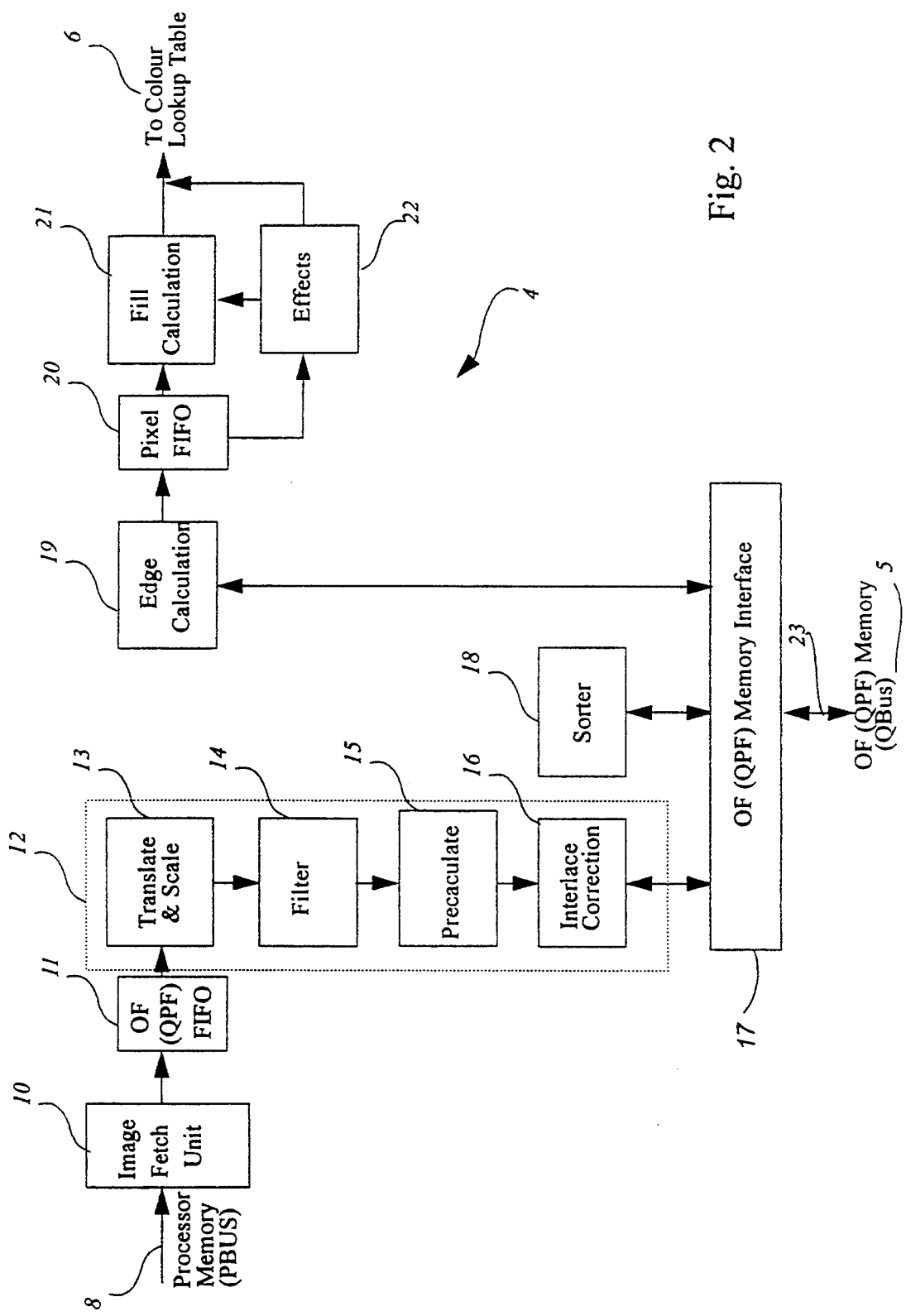
FIG. 2 is a data flow representation of the RTO processor of FIG. 1.

Referring now to FIG. 2, the data flow of the RTO processor 4 is shown wherein an image fetch unit 10 reads objects and object fragments, such as QPF's, from the processor memory 3 and these are output to an object fragment first-in-first-out register (OF FIFO) 11. Generally, the OF FIFO 11 is four words deep and data in the FIFO 11 is tagged as either object data or object fragment data because each object is generally described by a plurality of object fragments. The exception lies in an object that comprises a single straight line, of any length or inclination. The FIFO 11 is used to decouple data fetching from data processing so as to increase the efficiency of access to the processor bus 8.

Data moves out of the FIFO 11 into a pre-processing pipeline 12 that performs a series of calculations on the data before it is ready to be stored in the OF memory 5. The first of these operations is designated at (13) and acts to apply scaling and translation factors for the current object to its associated fragments. The next operation, indicated at (14) is to filter out those object fragments which will not affect the displayed image. The next operation, indicated at (15) is to iteratively recalculate the values in an object fragment which start before the first line of the display, to yield an object fragment starting on the first line of the display. Finally, the pre-processing pipeline 12 is completed by a step (16) which applies a correction to the object fragment if rendering of the resultant image is to be interlaced such as on a VDU.

As the data exits the pre-processing pipeline 12, the object fragments are stored in the memory 5 as a series of linked lists, one for each line of the resultant image.

A detailed discussion of the structure and operation of the pre-processing pipeline 12 can be obtained from U.S. patent application Ser. No. 08/053,378, filed Apr. 28, 1993, entitled "A Pre-processing Pipeline for RTO Graphic Systems", claiming priority from Australian Patent Application PL2142 of filed Apr. 29, 1992 and the disclosure of which is hereby incorporated by cross-reference.

After all of the object fragments of the image to be displayed have been fetched and stored in the memory 5, the linked list for each line is sorted 18 in order of pixel value, in preparation for rendering.

In video applications, image preparation of the new image occurs in one half of the memory 5, which is double buffered, while the other half is used for rendering (image manifestation). Because the memory 5 is single ported, image preparation and image rendering portions of the processor 4 compete for access on the OF bus 23.

Image rendering is commenced in synchronisation with the display device 7. Rendering consists of calculating the intersection of the object fragments with each line of the display in turn. These intersections define the edges of objects. Edge (or intersection) data is used in the calculation of the level which is to be displayed as a particular pixel position on the scan line. Edge calculation is performed within the block designated 19 in FIG. 2.

A detailed discussion of the structure and operation of the sorting block 18 and the edge calculation block 19 can be obtained from U.S. patent application Ser. No. 08/053,365, filed Apr. 28, 1993, entitled "Object Sorting and Edge Calculation for Graphic Systems", claiming priority from Australian Patent Applications PL2156 and PL2145, filed Apr. 29, 1992, and the disclosure of which is hereby incorporated by reference.

For each line in the image, the rendering process steps through the list of object fragments for that line, executing each of the following steps:

1. copying the pixel value, level and effects information into a pixel FIFO 20 for buffering prior to fill generation;
2. calculating the values of the OF intersections for the next line, or discarding OF's which terminate on the next line; and
3. merging the re-calculated OF into the linked list of OF's starting on the next line.

Rendering and re-calculation has the highest priority on the bus 23, but the bus 23 is freed for storage and sorting access whenever the pixel FIFO 20 is filled, or all of the OF's for the current line have been processed.

Data is sequenced out of the pixel FIFO 20, which is sixteen words deep, under the control of a pixel counter, which resides in the fill calculation block 21, and which is incremented by each pixel clock cycle, derived from the display 7. The fill calculation 21 resolves the priority levels of the objects in the display, and outputs the highest visible level at each pixel position to the look-up table 6 for display. The fill calculation 21 can be modified by an effects block 22 so as to implement visual effects such as transparency.

A detailed discussion of the structure and operation of fill calculation 21 can be obtained from U.S. patent application Ser. No. 08/053,212, filed Apr. 28, 1993, entitled "Method and Apparatus for Filling an Object Based Rasterised Image", claiming priority from Australian Patent Application PL2148 filed Apr. 29, 1992 and the disclosure of which is hereby incorporated by reference.

A detailed discussion of the structure and operation of the effects block 22 can be obtained from U.S. patent application Ser. No. 08/053,214, filed Apr. 28, 1993, entitled "Method and Apparatus for Providing Transparency in an Object Based Rastefised Image", claiming priority from Australian Patent Application PL2153, filed Apr. 29, 1992, and the disclosure of which is hereby incorporated by reference.

Figure 3:
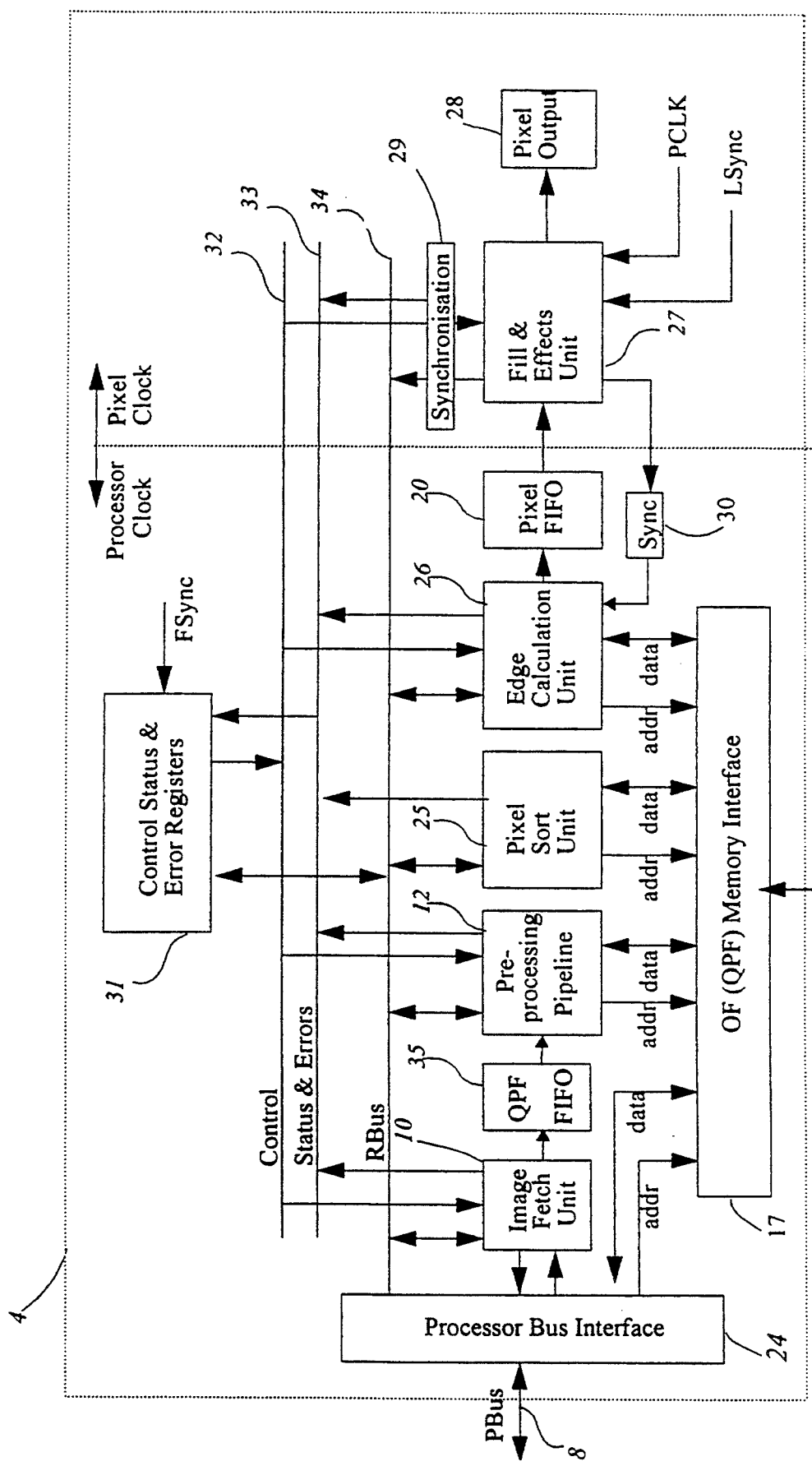
FIG. 3 is schematic block diagram representation of the RTO processor of FIGS. 1 and 2.

Turning now to FIG. 3, the internal structure of the processor 4 is shown which includes specific circuit blocks essentially corresponding to the configuration of FIG. 2.

Configuration and control of the RTO processor 4 is achieved by reading and writing internal control, status and error (CSE) registers 31. Internal register accesses are provided via a single bi-directional bus, call the RBus 34. Data transfer on the RBus 34 is strictly between the host processor 2 and the internal registers 31. There is no module to module communication within the RTO processor 4 on the bus 34.

The CSE registers 31 generate control signals for the data processing blocks. Other registers, such as those defining the OF memory size and configuration, line and frame blanking times, and so on, reside in the various data processing blocks, as do the error data registers. A processor bus interface 24 interconnects the buses 32,33,34 and the image fetch unit 10 to the processor bus 8, thereby permitting the host processor 2 control of the operation of the RTO processor 4.

The fill calculator 21 and effects unit 22 of FIG. 2 are combined as a single fill and effects unit (FEU) 27.

The majority of the RTO processor 4 is clocked at the host processor 2 clock frequency (generally 16 MHz where an INTEL i960SA processor is used). The exception is the FEU 27, which is docked at the pixel clock frequency (13.33 MHz). Control and status signals to and from the fill and effects unit 27 are re-synchronised as they cross the boundary between the clock regions. Data moves between the two regions via the PIXEL FIFO 20, whose reads and writes are asynchronous (with respect to each other).

The real-time operation of the image rendering blocks is synchronized to the display device 7 via the frame and line synchronization signals (FSync,LSync), and the pixel clock. Synchronization module 29 maintains synchronisation of operation of the FEU 27 to the remainder of the RTO processor 4 while a further synchronization module 30 controls the ECU 26 for each line of the display. A series of pixel output pads 28 provide buffering for the outputs of the FEU 27. Synchronization with the display 7 is achieved through tapping its line and frame synchronisation signals (LSync,FSync) as well as it's pixel clock (PCLK).

FIGS. 4 to 8 illustrate the process of rasterisation for the example of generating an image 40 formed by a background object 41, a character object of the letter A 42, and rectangular object 43, and a circular object 44.

In FIG. 4, the outline information of each of the objects 41–44 is shown and this is a series of numbers which describe each fragment of the outline curves, and the priority level of each curve fragment. This particular data is called the OF data and can be for example, QPF data.

As seen in FIG. 5, which schematically views into the layers of the image of FIGS. 4 along a single scan line 45, the edges of each of the objects 41–44 are shown. Calculation of the intersection of each scan line with the outline fragments to be rendered, results in a sorted list of the pixel position of each fragment into section, along with a priority level. In FIG. 5, the priority level is represented by the height (or stacking) of each object.

Next, as seen in FIG. 6, the regions to be filled are generated. These are filled using the "even/odd" rule. This is performed whereby the first edge intersection encountered turns the fill (colour) on, the second turns the fill off, the third turns the fill on, etc. This fill method allows for the generation of holes in specific objects, such as in the letter A 42.

FIG. 7 illustrates how hidden surfaces are removed. Some objects are obscured by other objects having a higher priority level. The step of FIG. 7 removes those portions of objects which are hidden by other objects.

The resultant image is thereafter coloured according to the pixel level and displayed in the manner shown in FIG. 8.

The operation of the RTO processor 4 is controlled on a frame-by-frame basis by the host processor 2. The image rendering and image preparation operations are controlled separately, by two bits in the CSE 31, IPEn (image preparation enable) and IREn (image render enable) and two interrupt register bits, IPC (image preparation complete) and IRC (image render complete). While the RTO processor 4 is operating, the contents of four status register bits IFA (image fetch active), PPA (preprocessing active), PSA (pixel sort active) and IRA (image render active) indicate the status of the operations.

Image preparation is initiated by the host processor 2 which writes to the CSE registers 31 to configure them correctly for the frame to be processed, and enables operation by setting the IPEn bit. Image preparation can proceed in several stages, depending on the number of object lists to be processed. When IPEn is set, the first object list is fetched, preprocessed and stored in the OF memory 5. When the object list is finished, the interrupt bit IPC is set, causing the interrupt output of the RTO processor 4 to be asserted. The host processor 2 then writes the start address of the next list to the RTO processor 4, and clears the interrupt bit, causing the RTO processor 4 to resume fetching activity. At the end of the last object list, indicated by a IPLast bit in the CSE register 31, the pixel sort is performed before the interrupt bit is set. If image preparation of the next frame is to start immediately, the host processor 2 writes the start address of the first list for the next frame, as well as any other register configurations, and then clear the interrupt bit. If image preparation for the next image is not to start immediately, the processor clears the IPEn bit of the control register 31 before clearing the interrupt.

Image rendering is controlled in much the same way as image preparation. Image rendering is initiated by setting the IREn bit of the control register after the other configuration registers have been written with their correct values. For the render case, the RTO processor 4 waits until it receives a FSYNC signal from the display device 7 before commencing the rendering activity. Rendering proceeds in synchronization with the display device 7, using LSYNC and the pixel clock inputs received from the display device 7 until all lines have been displayed. The RTO processor 4 then sets the IRC interrupt bit. As with image preparation, image rendering for the next frame can be commenced immediately by clearing the interrupt, or can be delayed by clearing the IREn bit before clearing the interrupt.

In video applications, when image preparation and image rendering occur simultaneously, the host processor 2 has to wait until both operations have been completed before initiating processing for the next frame. Either of the operations may finish before the other. When the first operation finishes, it must be disabled by clearing the appropriate enable bit until the other operation is finished. On receiving an interrupt, the host processor 2 can determine whether image preparation and image rendering are active by reading the CSE register 31. Image preparation is active if any of the bits IFA, PPA or PSA is set while image rendering activities indicated by the IRA bit.

In printing applications, image preparation and image rendering generally occur sequentially, so each is enabled in turn.

Whilst processing OF's, the RTO processor 4 constantly updates registers monitoring the NEXT_LINE and CURRENT_PIXEL being processed and the status and interrupt registers. The host processor 2 can read these registers at any time and maintain track of the operation of the RTO processor 4 as well as indicating the end of processing. The operation of the RTO processor 4 also includes an interrupt (INT) output which is asserted whenever an error condition arises, and can be used to interrupt the host processor 2. The RTO processor 4 can be halted by the host processor 2 at any time by clearing the appropriate enable bits. If the RTO processor 4 is processing data when this occurs, error bits will be set.

The RTO processor 4 has 32 control, configuration and status registers which are accessed via the processor bus 8. The registers are each 16 bits wide and form a 32 word block in the address space and the host processor 2. Not all bits of all registers are implemented. Unimplemented bits are read as zero, whilst reading unimplemented registers will return undefined data. The value in the registers will depend on the application in which the RTO processor 4 is being used.

In the preferred embodiment, the RTO processor 4 is configured to manipulate quadratic polynomial fragments (QPF's) described in detail in U.S. patent application Ser. No. 08/053,219, filed Apr. 28, 1993, claiming priority from Australian Patent Application No. PL 2150, filed Apr. 29, 1992, entitled "Object based graphics using quadratic polynomial fragments". QPFs are used because they represent a simple means by which complicated graphic objects can be divided into fragments which are capable of being processed at high speed at relatively low cost so as to achieve video data rate at a price within commercial consumer markets.

At the time of writing this specification, technology does not exist to achieve real time object rasterisation of curve with cubic polynomials such as Bezier splines as these involve significant levels of calculation and accordingly high levels of hardware integration and complexities that are presently beyond the reach of consumer markets. However, it is envisaged that with the present rate of growth of integrated circuit technology, that within approximately five to ten years, technology will be available for marketing hardware adapted for calculating cubic polynomials at consumer levels. Accordingly, the present invention is not limited to calculations using quadratic polynomial fragments and can be adapted, at a cost, to any polynomial format. So that Bezier spline objects can be used, at the present time, as these represent the industry standard for the representation of graphic objects, U.S. patent application Ser. No. 08/053,213, filed Apr. 28, 1993, discloses a means by which Bezier splines can be converted into QPFs and thereby easily processed by the preferred embodiment.

A QPF is composed of five components comprising a START_LINE, and END_LINE, a PIXEL value, a $\Delta$PIXEL value, and a $\Delta\Delta$PIXEL value. START_LINE and END_LINE indicate those scan lines of the raster display between which the QPF is formed. PIXEL represents the initial pixel value (location) on the START_LINE $\Delta$PIXEL relates to the slope of the QPF and $\Delta\Delta$PIXEL is a constant indicating the curvature of the QPF. In this manner, a QPF can be defined by the following formulae:

$$\text{PIXEL (line}_{n+1}) = \text{PIXEL (line}_n) + \Delta\text{PIXEL (line}_n) \quad \text{(EQ 1)}$$

$$\Delta\text{PIXEL (line}_{n+1}) = \Delta\text{PIXEL (line}_n) + \Delta\Delta\text{PIXEL}, \quad \text{(EQ 2)}$$

where $$\text{PIXEL (line}_{n=START\_LINE}) = \text{START\_PIXEL}, \text{ and} \quad \text{(EQ 3)}$$

$$\Delta\text{PIXEL (line}_{n=START\_LINE}) = \Delta\text{PIXEL (a constant)}. \quad \text{(EQ 4)}$$

The formats of the QPF component PIXEL, $\Delta$PIXEL and $\Delta\Delta$PIXEL, outlined in U.S. patent application Ser. No. 08/053,219, impose limits upon the accuracy with which images can be stored and rendered. QPFs are stored in compacted format in which in the processor memory 3, PIXEL is stored as a 16 bit integer, $\Delta$PIXEL a signed fixed point number with 8 bits of integer and 8 bits of fraction, and $\Delta\Delta$PIXEL as a signed fix point number with 16 bits of fraction. Translation and scaling convert these so that each has a 16 bit fractional part. PIXEL has a 16 bit integer part, while the integer pans of $\Delta$PIXEL and $\Delta\Delta$PIXEL are restricted to 8 bits. Therefore, after the translation scaling, the limits in range and accuracy of the QPF components are displayed in the following table.

TABLE 1

| COMPONENT | RANGE (PIXELS) | ACCURACY (PIXELS) |
| --- | --- | --- |
| Pixel | −32,768 to 32,768 | +/−0 |
| $\Delta$PIXEL | −128 to 128 | +/−0.002 |
| $\Delta\Delta$PIXEL | −128 to 128 | +/−7.63E-6 |

TABLE 1-continued

| COMPONENT | RANGE | ACCURACY (PIXELS) |
|---|---|---|
| | (Lines) | |
| StartLine | −32,768 to 32,767 | — |
| EndLine | −32,768 to 32,767 | — |

As a PIXEL is rendered, there is a cumulative error resulting from the repeated additions of $\Delta$PIXEL and $\Delta\Delta$PIXEL. After (n) lines of recalculation, the PIXEL value P(n) can be expressed in terms of the original QPF values as:

$$P(n) - PIXEL = n\Delta PIXEL + (n/2)(n-1)\Delta\ PIXEL \quad (EQ\ 5)$$

Using the accuracies indicated in Table 1, the values of (n) which will result in various error magnitudes in the display are shown in Table 2. These figures ignore the initial inaccuracy of the PIXEL value, representing only the accumulated error through recalculation.

TABLE 2

| ERROR MAGNITUDE | NUMBER OF LINES OF RECALCULATION FOR ERROR TO ACCUMULATE (n) |
|---|---|
| 0.5 pixels | 128 |
| 1.0 pixels | 200 |
| 2.0 pixels | 304 |
| 10.0 pixels | 748 |

Tables 1 and 2 show that single pixel errors occur after about 200 lines of recalculation. While QPFs of this length are in general rare, they become more common as images are zoomed in and out, and in printer applications, (where there are 6480 lines).

Figure 9:
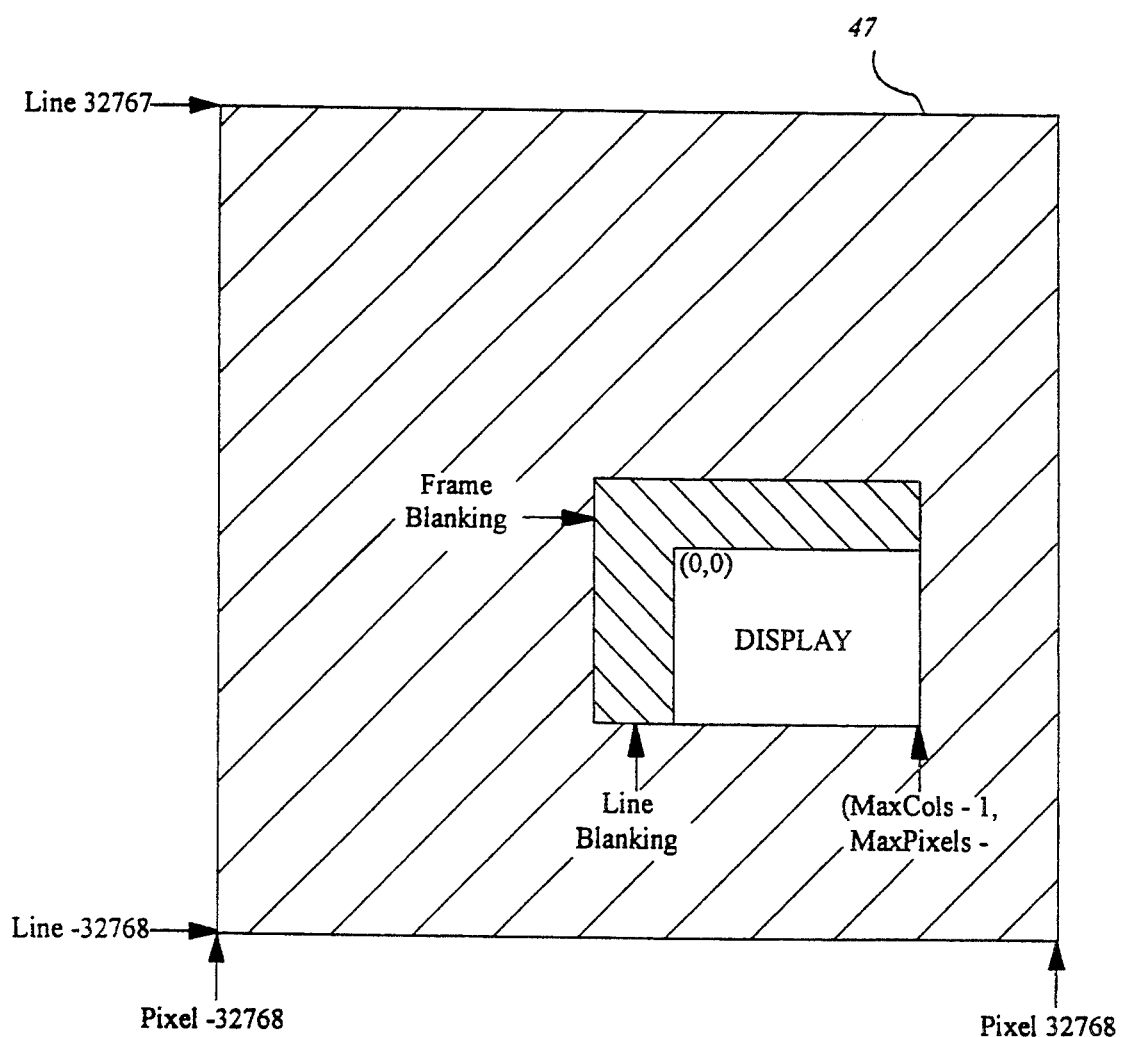
FIG. 9 shows the working and display areas of the RTO processor.

The range limits outlined in the Table 1, effect the integrity of the rendered image as it is zoomed and panned. In particular, on START_LINE and PIXEL imply a fixed sized working area 47 of 65,536 lines×65,536 pixels, with the displayed image being a fixed portion of this working area for each application. This is shown in FIG. 9. QPFs are rendered correctly provided they lie entirely within the working area 47 shown in FIG. 9.

When a QPF moves outside the working area 47, the RTO processor 4 will detect arithmetic overflow or underflow of a QPF component during image preparation or image rendering. When this happens, the calculated value is replaced by the positive or negative range limit for the component. This is arranged to prevent values from wrapping around, which can cause QPFs to appear or disappear in the displayed image, or to behave erratically. This hard limiting leads to a more gradual degrading of the image.

START_LINE values can exceed the bounds of the working area due to translation and scaling. PIXEL and $\Delta$PIXEL values can exceed their bounds anywhere during image preparation or image rendering.

Generally, the hard limiting will not affect the displayed image as it occurs, as values reaching their limits indicate that the current line or pixel values are at the extremes of this working area, well away from the displayed image. The effects of limiting will be seen a number of lines further down the display as subsequent re-calculation moves a QPF back into the displayed image. Errors due to limiting usually cause a horizontal or vertical offset of the displayed QPF from its true position.

The fundamental limitation upon the performance of the RTO processor 4, is the bandwidth of the OF (QPF) memory 5. Using static RAM, this is one 32-bit word every 62.5 nS (64 MBytes per second). The bus 23 is used for initial QPF storage, pixel sorting and edge calculation. The number of bus accesses for each of these operations is expressed below in terms of the following variables:

Q—total number of QPFs in an image;
N—total number of QPFs intersections in the image;
L—total number of lines in the displayed image; and
P—total number of pixels displayed in each line.

TABLE 3

| OPERATION | BEST CASE PERFORMANCE | WORST CASE PERFORMANCE |
|---|---|---|
| QPF Storage | | 6Q |
| Pixel Sort | | 7Q + (L*P) 16 + 2*L + P/32 |
| Edge calculation | 6N + 2L | |

The number of accesses to the bus 23 required for edge calculation defines the limit on the number of total QPF intersections which can be displayed on the line. The pixel FIFO 20 allows a local density of edges larger than the average density. A maximum of sixteen QPF outline intersections can take place in consecutive pixels before the FIFO 20 empties and the image tears.

The absolute limits on the performance of the RTO processor 4 are difficult to quantify, because of the variable lengths of QPFs and accordingly, the average number of QPF intersections caused by each QPF. In the following, numbers are derived for two possible average QPF lengths. The numbers assume that all of the available QPF memory bandwidth is used. In practice, the upper limit on this usage is likely to be close to 100%, approximately 95%.

VIDEO APPLICATIONS

The time available for rendering QPF intersections on a line is the period between LSYNC pulses. This period is longer than the time used to display all the pixels in the line—the additional time being the line blanking period. There are a fixed number of QPF memory cycles available in this time, which fixes the maximum number of QPF intersections that can be displayed on any line.

QPF intersections of three types must be considered in determining limits on the number of intersections which can be displayed. QPF intersections with negative pixel values are placed in the FIFO 20 and affect the display 7. These intersections are all dealt with in the FEU 27 as soon as they are put into the FIFO 20, so that they do not build up in the FIFO 20. Intersections with pixel values corresponding to the displayed pixels are dealt with in order as the pixel clock counts up to the pixel values. QPFs with pixel values greater than MAXPIXELS do not affect the display, and are not put in the pixel FIFO 20. Nevertheless, they must be recalculated like all other QPF's.

Assuming that the rendering of a line starts as soon as the display of the previous line finishes, the line blanking period can be used to render any negative pixel value QPF intersections, and up to sixteen displayed QPF intersections before the pixel FIFO 20 fills up. Because of the limited depth of the FIFO 20, only sixteen displayed intersections can be placed in the pixel FIFO 20 during line blanking before it fills. Therefore, edge calculation 19 will use all of the available bandwidth of the QPF bus 23 only if some of the QPFs being calculated are not displayed, and the maximum number of QPF intersections that can be calculated between two LSYNC pulses is larger than the maximum number of QPF intersections which can be displayed on the line. These two units are summarised below in Table 4 for NTSC and PAL video.

TABLE 4

| Application | Line Period | Line Display | QPF memory cycles in | Max QPFs rendered in line (Best Case) | | Max QPFs rendered in line (Worst Case) | |
|---|---|---|---|---|---|---|---|
| | | | | Total | Display | Total | Display |
| NTSC | 63.55 us | ~54 us | 1015 | 168 | 152 | 101 | 94 |
| PAL | 64 us | ~54 us | 1024 | 170 | 152 | 102 | 94 |

The best case figures in Table 4 occur when the line following the line being rendered has no QPFs starting on it, and no two QPFs on the line being rendered cross. This can be a fairly common occurrence, especially when rendering text. The performance of the RTO processor 4 will degrade slowly towards the worst case as the number of QPFs starting on the next line increases because additional cycles are needed for QPF merging. The worst case only occurs if there are QPFs starting on the next line which are positioned exactly interdigitated with each QPF intersection on the current line, which is extremely rare. The average case is mostly likely closer to the best case than to the worst. The above figures for QPF intersections on a single line assume that there is no image preparation cycles to QPF memory 5 while the line is being rendered. Consequently, the above figures for QPF intersections per line cannot be maintained for the whole image. The proportion of total QPF memory cycles required for image rendering depends upon the average QPF length. Table 5 summarises the performance for two values of average QPF length. Table also gives the maximum number of QPF that can be rendered in an image for different average QPF lengths.

TABLE 5

| | Best rendering speed | | Worst case rendering speed | |
|---|---|---|---|---|
| Average QPF length | Maximum QPFs | Maximum av. QPF intersect. per line | Maximum QPFs | Maximum av. QPF intersect. per line |
| 2 | 10100 | 85 | 7970 | 64 |
| 10 | 3480 | 145 | 2248 | 94 |

It is to be noted that the values shown in Table 5 apply only to QPFs that actually progress as far as rendering. Long QPFs will generally result from magnification of an image, in which case many QPFs will end up entirely above or below the display, and will be culled during image preparation. However, QPFs to the left and right of the display will not be filtered by the RTO processor 4, and will be rendered

PRINTER APPLICATIONS

In printer applications, image preparation and image rendering are usually not performed at the same time. Image preparation is during page blank (a period of 1.13 seconds for example in the Canon CLC500 Copier). Image rendering commences after this. The Canon CLC 500 Copier print lines each have 4632 pixels, and the line period is 396 microseconds. This results in values shown in Table 6 for maximum QPFs rendered per line.

TABLE 6

| Application | Line Period | QPF memory cycles in Period | Max. QPFs rendered line (Best Case) | | Max QPFs rendered line (Worst Case) | |
|---|---|---|---|---|---|---|
| | | | Total | Displayed | Total | Displayed |
| CLC | 396 us | 6336 | 1056 | 934 | 633 | 563 |

These maximum rates can be maintained for all lines of the image, as there is no competition for QPF memory bandwidth.

Furthermore, image preparation has sufficient time to complete, and therefore does not affect the maximum number of QPFs in an image. In the preferred embodiment, the RTO processor 4 has a limit of about 62,000 QPFs before addressable QPF memory space is exceeded. It is likely that this will be the limiting factor on the complexity of printed images.

The figures provided in Table 7 indicate the number of QPFs which can be rendered as function of the average QPF length.

TABLE 7

| Average QPF length | Maximum QPFs at best case rendering speed | Maximum QPFs at worst case rendering speed |
|---|---|---|
| 50 | 136 800 | 82 000 |
| 500 | 13 680 | 8 200 |

LOCAL IMAGE QUALITY LIMITS

Figure 10A:
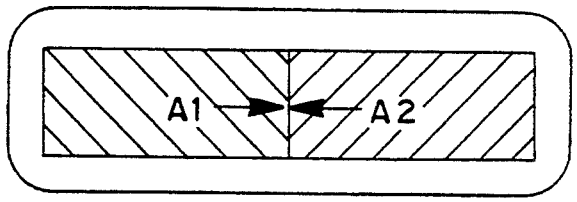
FIGS. 10(A)-10(B), 11(A)-11(B), and 12(A)-12(B) show examples of the limitations of the RTO processor.
Figure 10B:
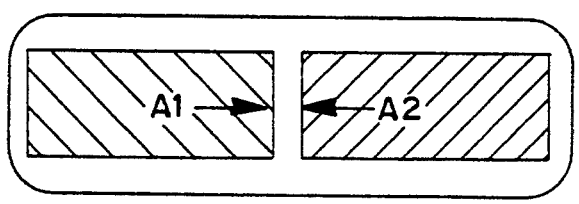

There are three basic limitation to the ability of the RTO 4 processor to display each object edge in the correct position on a line. When an edge is displayed in the wrong position, a TEAR error is signalled. Examples of three limitations are shown in FIGS. 10(1), 10(2), 11(1), 11(2), 12(1) and 12(2).

The first limitation arises due to the fact that the RTO processor 4 can only render one object edge at any particular pixel position. If two objects in the image have coincident edges, there is a one pixel error in the position of one of the edges. This will impact upon the display 7 in most cases, unless the incorrect edge is a hidden edge. A first example is shown in FIGS. 10(1) and 10(2) which shows two objects with coincident edges. The edges are represented by QPF's A1 and A2, which intersect over several scan lines at the same pixel value. If QPF A1 is placed into the pixel FIFO 20 before QPF A2, there will be a one pixel wide display of the background colour between two objects. This error is seen in FIG. 10(2).

The second limitation arises in the edge calculation 19. QPFs which cross each other have to be reordered while making the linked list for the next line. Otherwise, their intersections with the next line will be placed in the pixel FIFO 20 in the wrong order. Because the internal registers of the RTO processor 4 only refer to two QPFs from a line at any time, each QPF can be crossed by at most one other QPF between successive lines. This means that one QPF can cross many other QPFs, but where three QPFs intersect and cross, two of the QPFs will end up in the next line list in the wrong order. This will cause an error in the next line of the image of up to twice the maximum value of $\Delta$PIXEL or 255 pixels.

Figure 11A:
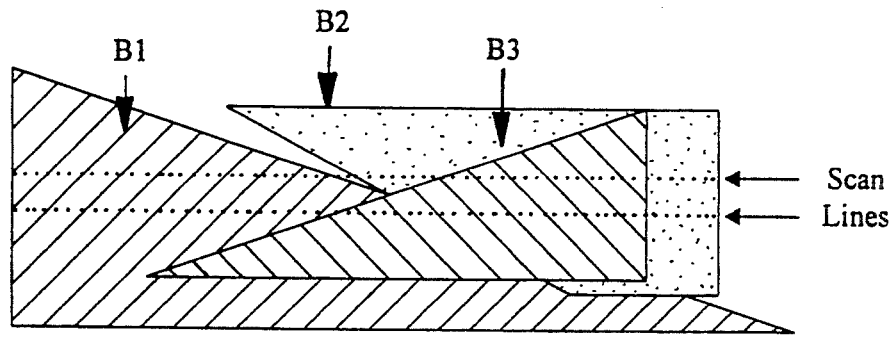
Figure 11B:
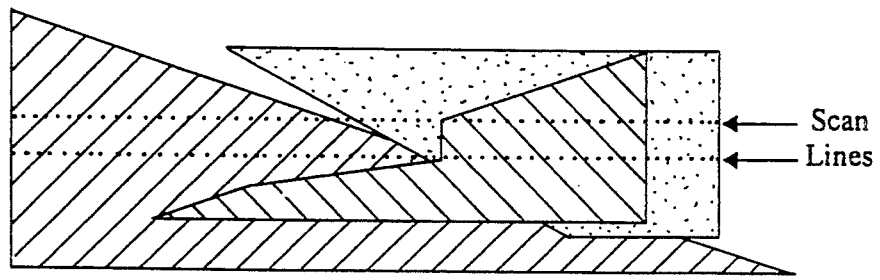

The example shown in FIGS. 11(1) and 11(2) shows three objects lying on top of each other. The three QPFs B1, B2 and B3 cross each other between the two scan lines marked. On the first scan line, the order of intersection is B1, B2, then B3. On the next scan line, this order should be reversed (B3, B2, B1), but in fact the intersections are placed in the pixel FIFO 20 in the order B2, B3, B1. As a result, intersection of QPF B3 with the second scan line will be rendered in the wrong place, as it will not be moved out of the pixel FIFO 20 until after B2's intersection with that same scan line has been rendered. On the following scan line, B2 and B3 will be rendered and will be rendered correctly.

The third limitation is caused by the limited depth of the pixel FIFO 20, and the fact that the render process cannot calculate QPF intersections as fast as they are displayed. In the worst case, the PIXEL FIFO 20 can be emptied in sixteen consecutive pixel clock cycles, after which edges can only be displayed at the rate at which they are calculated, that is approximately one edge every eight pixels in the worst case. Edges that occur at a higher density will not be displayed in the correct position.

Figure 12A:
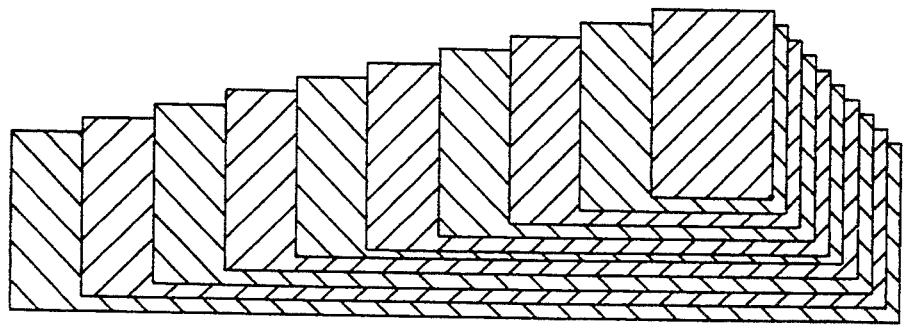
Figure 12B:
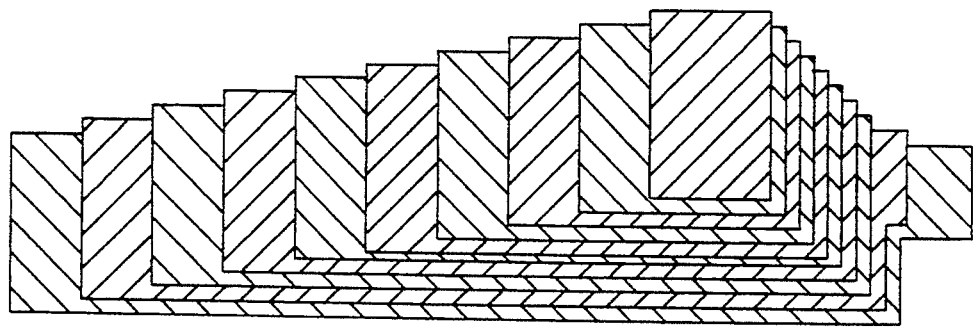

The example shown in FIGS. 12(1) and 12(2) shows ten objects, whose trailing edges lie on adjacent pixels. The first eight objects are rendered correctly, but the trailing edges of the ninth and tenth objects cannot be calculated fast enough to be rendered in the correct position. This will apply until the local edge density is reduced.

PROCESSOR MEMORY BANDWIDTH

The RTO processor 4 can address memory anywhere in the processor memory 3 address space, and can work with memory of any speed. However, the speed of the processor memory 3 is a possible limiting factor on the number of QPFs in an image for video applications. As shown above, the RTO processor 4 is capable of rendering up to about 8,000–10,000 QPFs, if the average length of the QPF is low (about two lines). If the processor memory 3 is too slow to allow this number of QPFs to be fetched and processed by the image preparation hardware in a single frame time, then it will be a limiting factor upon the performance of the RTO processor 4.

QPF data is fetched by DMA (direct memory access) burst cycles on the processor bus 8, which uses 16 bit words in the preferred case where an INTEL i960 processor is used as the host processor 2. The minimum number of words in each burst is set at 4 by the image fetch unit 10, which will not start a burst unless there are at least four free positions in the OF (QPF) FIFO 11. Bursts will typically be longer than this, as items will be removed from the QPF FIFO 11 while the burst is occurring. The total number of cycles required to fetch each image depends on the number of objects and QPFs in the image, the number of cycles required to fetch each word, and the average length of the DMA bursts. Each QPF is made up of five 16 bit words, each object requires nine 16 bit words, and each DMA cycle has an overhead of four clock cycles. This means the number of processor clock cycles required to fetch an image is:

total cycles = (5* number of QPFs + 9* number of objects) * (cycles per word + 4/average burst lengths). (EQ 6)

Table 8 expresses this total of cycles required to fetch an image at a percentage of the number of cycles available, which is 266,667 for a 60 Hz frame rate (NTSC) with a 16 MHz processor clock.

TABLE 8

| Memory Access Time | % PBus bandwidth required for image fetching | | | |
|---|---|---|---|---|
| | 500 objects 4000 QPFs 4 word bursts | 50 objects 4000 QPFs 20 word bursts | 100 objects 8000 QPFs 4 word bursts | 100 objects 8000 QPFs 20 word bursts |
| 214–275 ns (5 Cycles/ Word | 46% | 40% | 92% | 80% |
| 155–210 ns (4 Cycles/ Word | 38% | 32% | 77% | 64% |
| 90–150 ns (3 Cycles/ Word | 31% | 25% | 61% | 49% |
| 25–85 nc (2 Cycles/ Word | 23% | 17% | 46% | 34% |
| <25 (1 Cycle/Word | 16% | 9% | 31% | 18% |

The values in Table 8 refer to the bandwidth requirements of the RTO processor 4 averaged over the entire frame time (16.67 ms). However, when the RTO processor 4 is working at the limit of its performance, its memory fetch activity must, on average be completed in about half of the frame time. The reason for this is as follows.

Assume that the RTO processor 4 is fully utilising its available QPF memory 5 bandwidth, and that image rendering accesses to QPF memory 5 are distributed evenly in time. Image preparation accesses to QPF memory 5 will then also be evenly distributed, and will continue throughout the entire frame time. The image preparation accesses come from two sources: image fetching and storing, which uses 6 QPF memory accesses per QPF, and pixel sorting, which uses seven QPF memory accesses per QPF. With these accesses distributed evenly, the fetching and storing part of image preparation must be completed in slightly less than half the total frame time, otherwise there will not be sufficient QPF memory cycles available to complete the pixel source 18. As a consequence, all of the image fetch activity on the processor bus 8 will be finished in less than half the frame. This means that the processor memory 3 must be fast enough to keep the total image fetch bandwidth requirement under about 45%.

Based on the figures in Table 8, the RTO processor 4 can reach its peak rendering speed for short (average two lines) QPFs only if the processor memory 3 access speed is about 85 ns or faster.

QPF MEMORY

The required volume of QPF memory depends on the number of QPFs to be rendered. Each QPF requires 16 bytes. In addition, the start of list pointers and the sorting process working space require that an area of memory be left clear of QPFs. The size of this area of memory is:

4 bytes * (number of lines)+4 bytes * (number of pixels of a line+2)+4 bytes * ((number of pixels in a line+2)/32). (EQ 7)

This results in 4912 bytes for NTSC video, 5280 bytes for PAL video, and 45072 bytes for Canon CLC500 printing.

In the preferred embodiment, the maximum size of QPF memory is two banks of 1 MByte each. This limitation is imposed by the format chosen for QPFs in QPF memory, in which the NEXT pointer, for the linked lists, of each QPF uses 16 bits. This limits the maximum number of QPFs to 65536, each occupying four 32-bit words in processor memory 3. The practical limit on the number of QPFs is slightly less than this figure, as QPFs are excluded from the working space outlined above. As a result, the maximum number of QPFs is 65229 for NTSC, 65206 for PAL and 62719 for printing.

With a processor clock speed of 16 MHz, QPF memory access time is required to be about 35 ns.

Specific examples of the application of the RTO processor 4 and the graphics system 1 can be found in the following specifications:

U.S. patent application Ser. No. 08/053,410, filed Apr. 28, 1993, claiming priority from Australian Patent Application No. PL2144, filed Apr. 29, 1992, entitled "Video Camera/Recorder/Animator Device"; U.S. patent application Ser. No. 08/053,364, filed Apr. 28, 1993, claiming priority from Australian Patent Application No. Pl2143, filed Apr. 29, 1992, entitled "A Presentation Graphics System for Colour Laser Copier"; U.S. patent application Ser. No. 08/053,194, filed Apr. 28, 1993, claiming priority from Australian Patent Application No. PL2157, filed Apr. 29, 1992, entitled "A Portable Video Animation Device"; U.S. patent application Ser. No. 08/053,362, filed Apr. 28, 1993, claiming priority from Australian Patent Application No. PL2155, filed Apr. 29, 1992, entitled "An Integrated Graphics System for a Colour Laser Copier"; U.S. patent application Ser. No. 08/053,218, filed Apr. 28, 1993, claiming priority from Australian Patent Application No. PL2151, filed Apr. 29, 1992, entitled "An Information Display System"; U.S. patent application Ser. No. 08/053,216, filed Apr. 28, 1993, claiming priority from Australian Patent Application No. PL2146, filed Apr. 29, 1992, entitled "A Real-Time Interactive Entertainment Device"; and U.S. patent application Ser. No. 08/053,363, filed Apr. 28, 1993, claiming priority from Australian Patent Application No. PL2154, filed Apr. 29, 1992, entitled "A Multi-Media Device".

All lodged concurrently herewith and the disclosure of each of which is hereby incorporated by reference.

These documents, and those previously cross-referenced, illustrate the ability of the RTO processor 4 to render object graphics in real-time without an image frame or line store. The RTO processor 4 has been integrated into a single LSI device which, with mass productio, places the graphics system 12 well within the price range of consumer markets.

The foregoing describes only a number of embodiments of the present invention, and modifications obvious to those skilled in the art can be made thereto without departing from the scope of the present invention.

For example, although the preferred embodiment utilizes object fragments formed of QPF's, other types of data structures, such as cubic polynomials can be used when appropriately supported in hardware.

We claim:

1. An object based graphics processor comprising:
   input means for receiving object outlines of an image intended for rasterized display, each said outline comprising at least one object fragment and a corresponding priority level;
   sorting means for sorting said object fragments into a rasterization sequence corresponding to each display line of a raster format;
   reading means for reading said sequence in real-time and calculating object edges, each having one of said priority levels in each said display line; and
   priority means for assigning pixel data values within each said display line based upon the priority level of said object edges, said pixel data values being output from said processor for rasterized display.

2. An object based graphics processor as claimed in claim 1 wherein each of said object outlines is defined by at least one quadratic polynomial fragment.

3. An object based graphics processor as claimed in claim 1 wherein said input means comprises translation and scaling means adapted to translate and scale said object fragments.

4. An object based graphics processor as claimed in claim 1 wherein said input means comprises clipping means adapted to determine those object fragments forming parts of objects which do not form part of said pixel data values being output from said processor and discarding same.

5. An object based graphics processor as claimed in claim 1 wherein said input means comprises precalculation means adapted to determine partial object fragments lying partially off said rasterised display and to calculate a first line pixel edge value for said partial object fragments.

6. An object based graphics processor as claimed in claim 1 further comprising queuing means interconnected between said reading means and said priority means.

7. An object based graphics processor as claimed in claim 6 wherein said queuing means represents a synchronization boundary between said input means, said sorting means, and said reading means on one hand, and said priority means and a display device upon which said image is displayed on the other.

8. An object based graphics processor as claimed in claim 1 wherein said priority means includes a visual effects means adapted to alter said pixel data values based upon said priority levels assigned to said object edges.

9. An object based graphics processor as claimed in claim 1 wherein said priority means assigns pixel data values using an even/odd fill rule.

10. An object based graphics processor according to claim 1, wherein, when a plurality of object edges are within a particular pixel in said display line, said priority means determines which object edge has a highest priority level from said plurality of object edges and assigns that highest priority level as the pixel data value of said particular pixel.

11. An object based graphics processor comprising:
input means for receiving object outlines of an image intended for rasterized display, each said outline comprising at least one object fragment and a corresponding priority level;
sorting means for sorting said object fragments into a rasterization sequence corresponding to a scan line in a raster format for rasterized display;
storing means having a first storage area and a second storage area connected to said sorting means and adapted to store said rasterization sequence in one of said storage areas;
reading means connected to said storing means for reading a previously stored rasterization sequence in real-time and calculating object edges, each having one of said priority levels in a respective scan line; and
priority means for assigning pixel data values within each said scan line based upon the priority level of said object edges, said pixel data values being output from said processor for rasterized display.

12. An object based graphics processor as claimed in claim 11 wherein said receiving means and said sorting means operate substantially in parallel with said reading means.

13. An object based processor as claimed in claim 11, wherein in the case said receiving means and said sorting means utilize one of said storage means to form one said rasterization sequence, said reading means utilizes the other of said storage areas for calculating said object edges in relation to a previous rasterization sequence.

14. An object based graphics system comprising:
a host processor means having an associated memory means for storing outlines of graphic objects, said host processor means being adapted to generate from said outlines lists of said outlines wherein each of said list represents data relating to an image intended for rasterized display;
display means for displaying said image;
colouring means for associating colour data with each said object, said colour data being output to said display means in a rasterized format; and
an object based graphics processor interposed between said host processor and said colouring means for receiving said lists and rendering said pixel data values to said colouring means in real-time to permit real-time display of said image on said display means, said object based graphics processor includes input means for receiving object outlines of an image intended for rasterized display, each said outline comprising at least one object fragment and a corresponding priority level, sorting means for sorting said object fragments into a rasterization sequence corresponding to each display line of a raster format, reading means for reading said sequence in real-time and calculating object edges, each having one of said priority levels in each said display line, and priority means for assigning pixel data values within each said display line based upon the priority level of said object edges, said pixel data values being output from said processor for rasterized display.

15. An object based graphics system as claimed in claim 14 wherein said system is characterised by the absence of a discrete pixel data storage means.

16. An object based graphics system as claimed in claim 15 wherein said pixel data storage means is selected from the group consisting of a line store and a frame store.

17. An object based graphics system as claimed in claim 14 further including conversion means for converting said object outlines from a spline based format to a quadratic polynomial based format.

18. An object based graphics system as claimed in claim 17 wherein said conversion means forms part of said host processor means.

19. An object based graphics system as claimed in claim 17 wherein said coversion means forms part of said input means.

20. An object based graphics system comprising:
a host processor means having an associated memory means for storing outlines of graphic objects, said host processor means being adapted to generate from said outlines lists of said outlines wherein each said list represents data relating to an image intended for rasterized display;
display means for displaying said image;
colouring means for associating colour data with each object, said colour data being output to said display means in a rasterized format; and
an object based graphics processor interposed between said host processor and said colouring means for receiving said lists and rendering said pixel data values to said colouring means in real-time to permit real-time display of said image on said display means, said object based graphics processor including input means for receiving object outlines of an image intended for rasterized display, each said outline comprising at least one object fragment and a corresponding priority level, sorting means for sorting said object fragments into a rasterization sequence corresponding to a scan line in a raster format for rasterized display, storing means having a first storage area and a second storage area connected to said sorting means and adapted to store said rasterization sequence in one of said storage areas, reading means connected to said storing means for reading a previously stored rasterization sequence in real-time and calculating object edges, each having one of said priority levels in a respective scan line, and priority means for assigning pixel data values within each said scan line based upon the priority level of said object edges, said pixel data values being output from said processor for rasterized display.

* * * * *

UNITED STATES PATENT AND TRADEMARK OFFICE
CERTIFICATE OF CORRECTION

PATENT NO. : 5,444,839

DATED : August 22, 1995

INVENTORS : Kia Silverbrook, et al.

It is certified that error appears in the above-identified patent and that said Letters Patent is hereby corrected as shown below:

COLUMN 1

Line 13, "am" should read --are--;
Line 40, "them" should read --there--;
Line 44 "rasterisation of said" should read --rasterization of the--;
Line 50, "display, each" should read --display. Each--; and
Line 51, "fragment; should read --fragment.--.

COLUMN 4

Line 28, "cross-" should be deleted.

COLUMN 5

Line 27, "Rastefised" should read --Rasterized--; and
Line 57, "docked" should read --clocked--.

COLUMN 8

Line 58, "pans" should read --parts--.

UNITED STATES PATENT AND TRADEMARK OFFICE
CERTIFICATE OF CORRECTION

PATENT NO. : 5,444,839

DATED : August 22, 1995

INVENTORS : Kia Silverbrook, et al.

It is certified that error appears in the above-identified patent and that said Letters Patent is hereby corrected as shown below:

COLUMN 16

Line 26, "productio," should read --production--.

Signed and Sealed this

Nineteenth Day of December, 1995

Attest:

BRUCE LEHMAN

Attesting Officer

Commissioner of Patents and Trademarks